Nov. 29, 1949   E. J. LIFNER   2,489,911
STEAM CYLINDER VALVE GEAR
Filed June 16, 1944   8 Sheets-Sheet 1
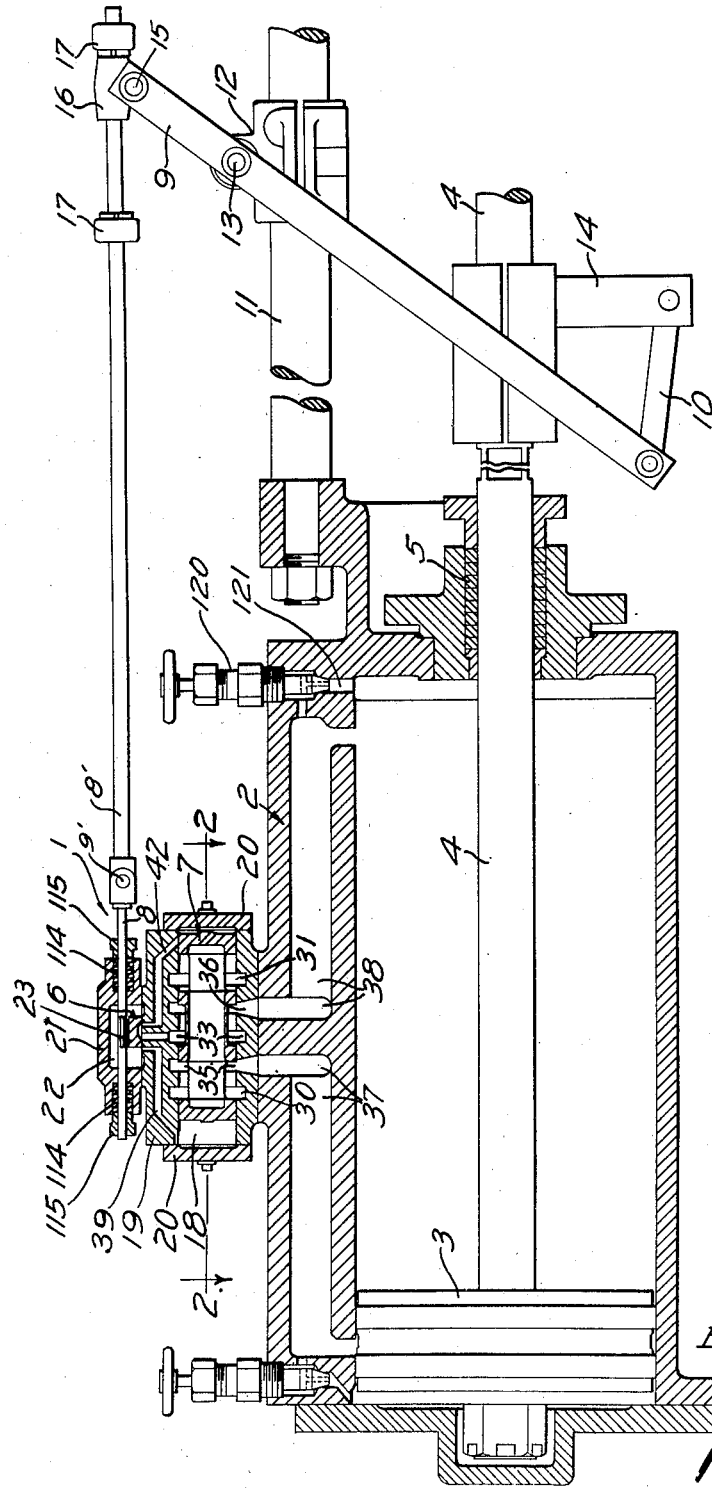
Fig. 1.
Eric J. Lifner
INVENTOR
ATTORNEY

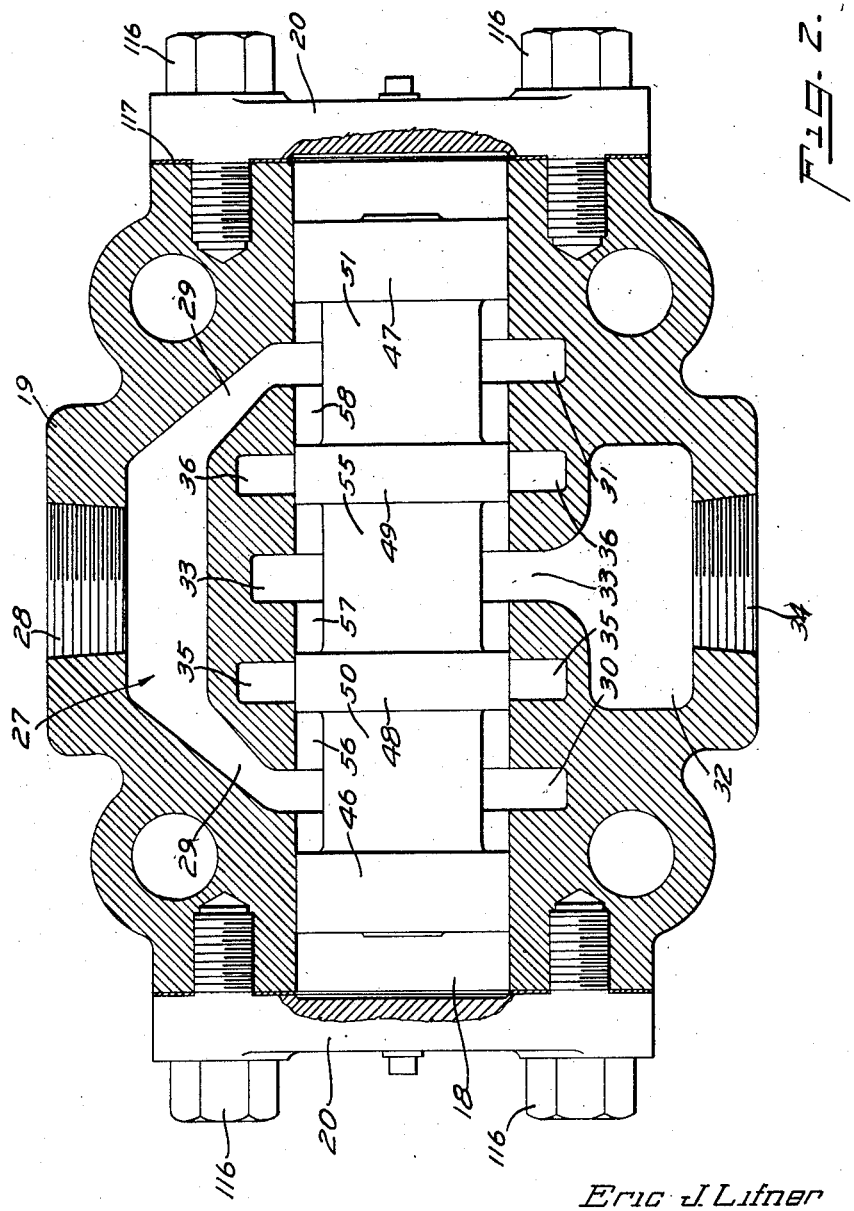

Nov. 29, 1949     E. J. LIFNER     2,489,911
STEAM CYLINDER VALVE GEAR
Filed June 16, 1944     8 Sheets-Sheet 3
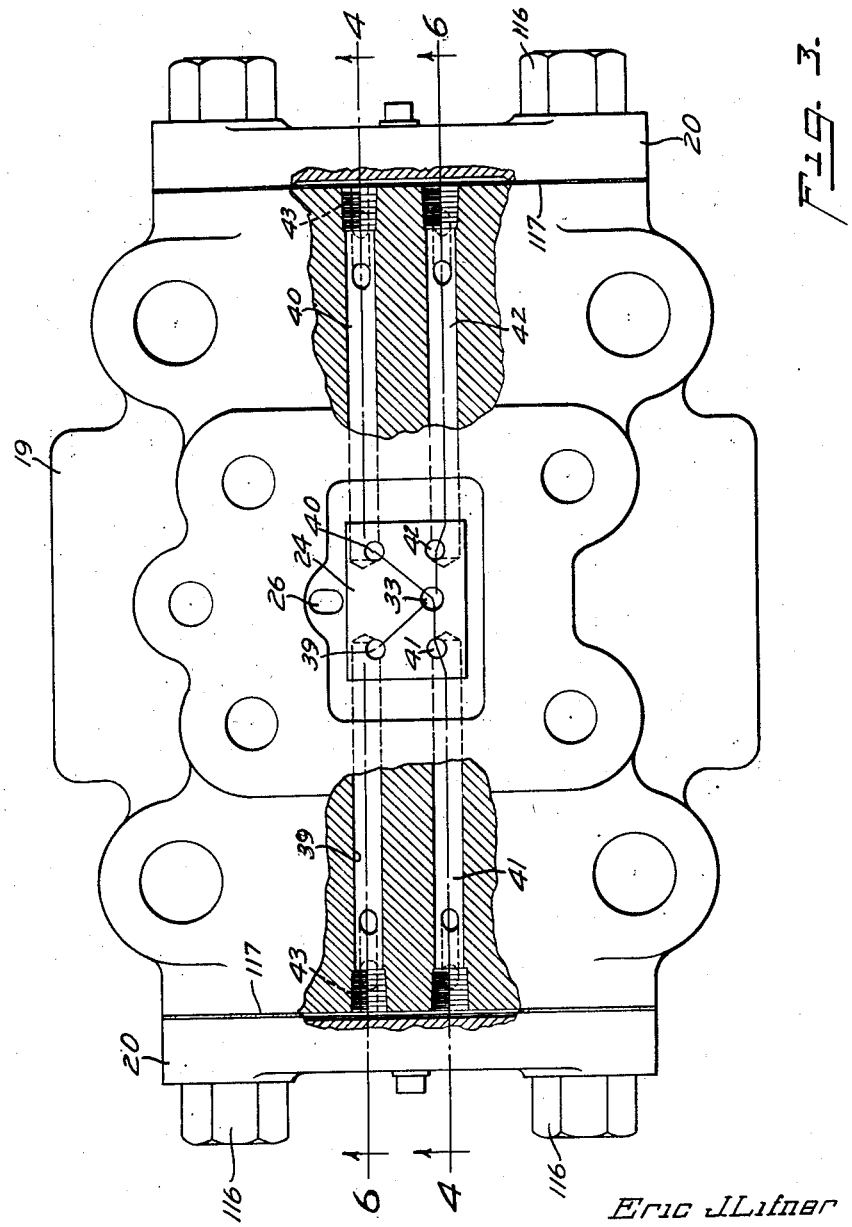
Eric J. Lifner
INVENTOR
BY Rob't Meyer
ATTORNEY

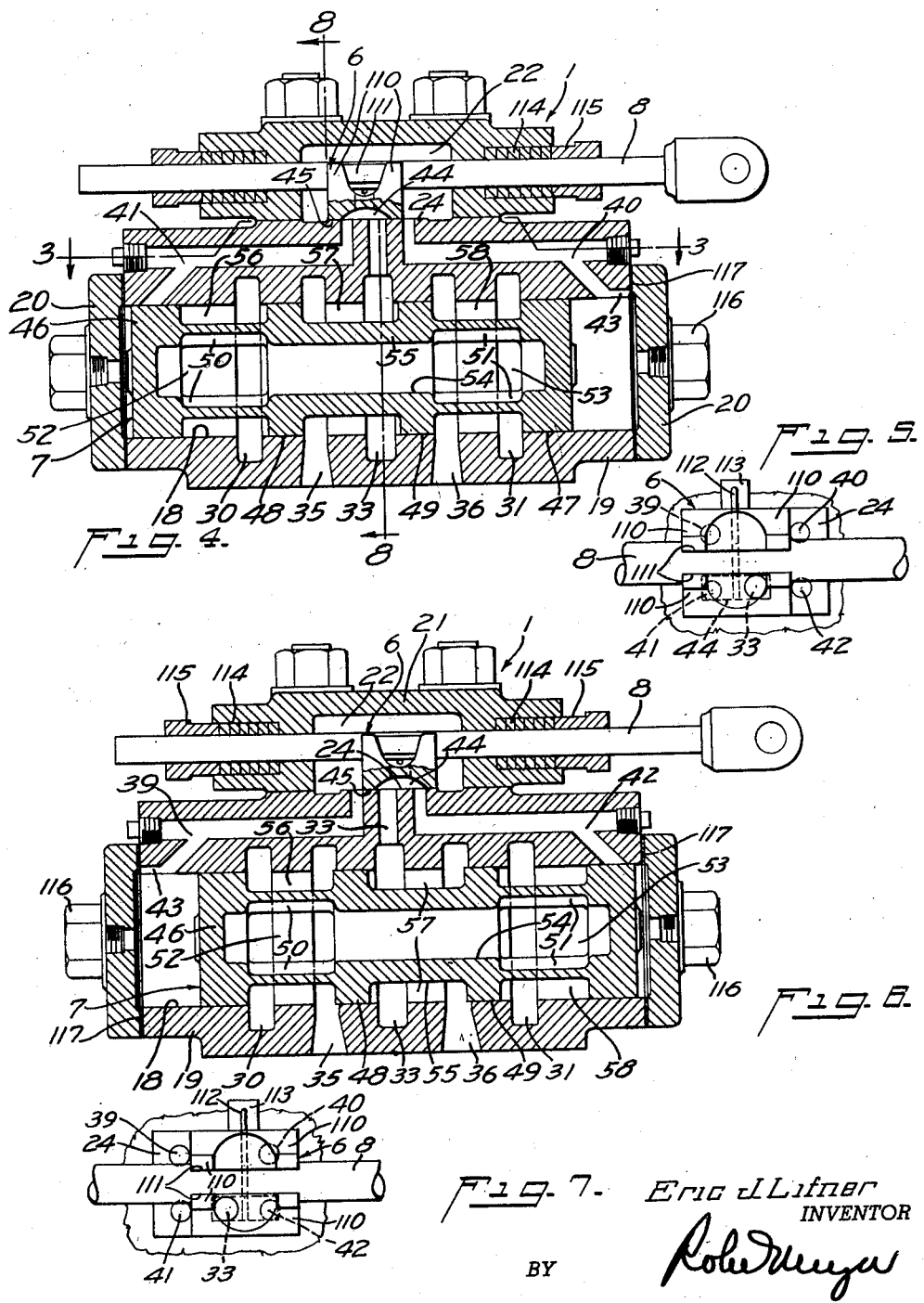

Eric J. Lifner
INVENTOR

BY
ATTORNEY

Nov. 29, 1949  E. J. LIFNER  2,489,911
STEAM CYLINDER VALVE GEAR
Filed June 16, 1944  8 Sheets-Sheet 6

Eric J. Lifner
INVENTOR

BY
ATTORNEY

Nov. 29, 1949     E. J. LIFNER     2,489,911
STEAM CYLINDER VALVE GEAR

Filed June 16, 1944     8 Sheets—Sheet 7

Eric J. Lifner
INVENTOR

BY

ATTORNEY

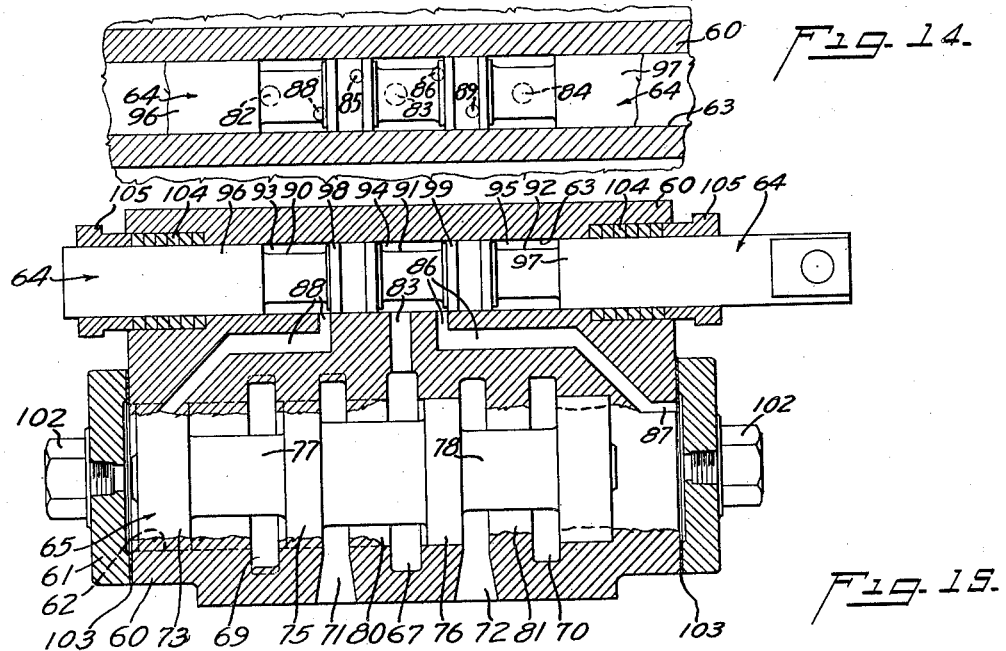
Fig. 14.
Fig. 15.
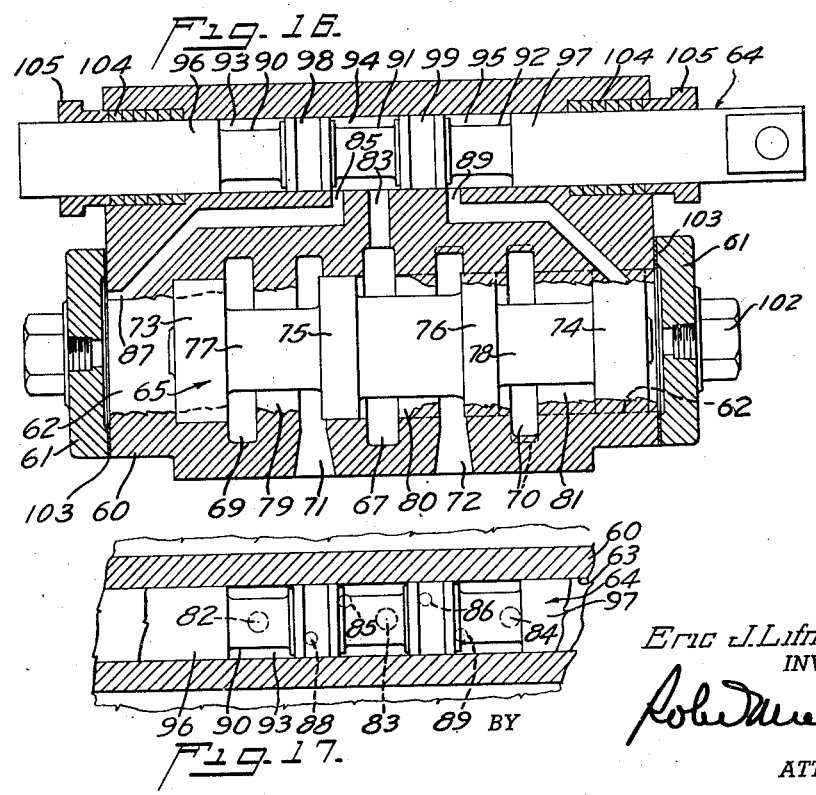
Fig. 16.
Fig. 17.
Eric J. Lifner
INVENTOR
ATTORNEY Patented Nov. 29, 1949

2,489,911

UNITED STATES PATENT OFFICE 2,489,911

STEAM CYLINDER VALVE GEAR

Eric J. Lifner, Newark, N. J., assignor to Worthington Pump and Machinery Corporation, Harrison, N. J., a corporation of Delaware Application June 16, 1944, Serial No. 540,647

2 Claims. (Cl. 121—157)

This invention relates to steam cylinder valve gears, and more particularly to a valve gear for single direct-acting pumps.

An object of the present invention is to provide a steam cylinder valve gear embodying a steam chest of such design as to facilitate formation of the steam ports therein.

Another object is to provide in a steam cylinder valve gear, a steam chest of relatively simple design wherein in one embodiment thereof, omitting steam chest heads, the structure comprises a single casting; and wherein in another embodiment thereof, omitting steam chest heads, the structure comprises a single casting and a cover, but in which the steam ports in either case are so arranged as to greatly simplify all boring or coring operations.

Another object is to provide a steam chest embodying a pilot valve or auxiliary slide valve and a valve seat or face co-acting therewith for controlling the flow of live steam and exhaust steam through the several ports in the steam chest, and in which means are embodied for bringing the pilot valve into proper seating engagement with the valve face when the individual parts of the steam chest are assembled and for compensating for wear on the pilot valve, the valve face or both.

A further object is to provide a steam chest embodying a pilot valve or auxiliary slide valve having an operating valve rod connected therewith and passing through stuffing boxes, and in which the live steam ports and the exhaust steam ports are so arranged as to subject the stuffing boxes to exhaust steam pressure only to thereby decrease the necessary gland pressure for effecting a seal, thus reducing friction and prolonging the life of both the packing and the valve rod.

With these and other objects in view, as may appear from the accompanying specification, the invention consists of various features of construction and combination of parts, which will be first described in connection with the accompanying drawings, showing a steam cylinder valve gear of a preferred form embodying the invention, and the features forming the invention will be specifically pointed out in the claims.

In the drawings:

Figure 1 is a sectional view of a steam cylinder valve gear in accordance with the present invention and as applied to a steam cylinder.

Figure 2 is an enlarged sectional view taken along the line 2—2 of Figure 1, with portions thereof shown in elevation.

Figure 3 is an enlarged and partial sectional view taken substantially along the line 3—3 of Figure 4.

Figure 4 is a vertical sectional view of the steam chest structure showing its pilot valve and main piston valve in one position, the section being taken substantially along the line 4—4 of Figure 3.

Figure 5 is a face view of a pilot valve and its co-acting valve face.

Figure 6 is a view similar to Figure 4 but showing the pilot valve and main piston valve in another operating position, and being a section taken substantially along the line 6—6 of Figure 3.

Figure 7 is a view similar to Figure 5 but illustrating the pilot valve in the corresponding position of Figure 6.

Figure 14 is a sectional view illustrating a piston type pilot valve in association with co-acting steam ports, with the pilot valve located in one extreme position.

Figure 15 is a sectional view taken substantially along the line 15—15 of Figure 12, with the pilot valve located in the corresponding position of Figure 14.

Figure 16 is a sectional view taken substantially along the line 16—16 of Figure 12, but showing the pilot valve in its other extreme position.

Figure 17 is a sectional detail view similar to Figure 14 but illustrating the pilot valve in the corresponding position of Figure 16.

Figure 8:
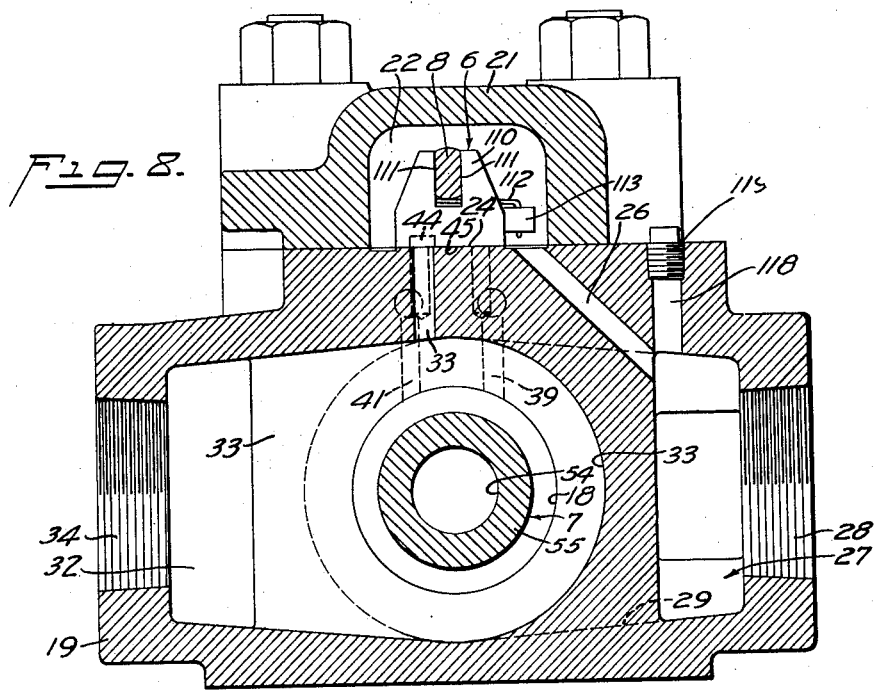
Figure 8 is an enlarged sectional view taken along the line 8—8 of Figure 4.

Referring more particularly to the drawings, Figure 1 illustrates a steam cylinder valve gear 1 in association with a steam cylinder 2. A reciprocating piston 3 is contained in the steam cylinder 2 and is attached to a piston rod 4 which extends through a stuffing box 5 for connection with the liquid piston body of a direct-acting pump (not shown). The valve gear 1 includes a sliding pilot valve 6 and a main piston valve 7. In Figure 1, a valve rod 8 is connected with the pilot valve 6 for moving the pilot valve 6 back and forth, as through the medium of a lever 9 and a link 10, and a valve rod link 8'. A tie rod 11 serves as a mount for a cross stand 12 upon which the lever 9 is pivotally connected intermediate its ends, as in 13. A piston rod spool 14 is attached to the piston rod 4, and the link 10 is pivotally connected with both the spool and the lever 9 to impart pivotal movement to the latter through reciprocation of the piston rod 4. The lever 9 is pivotally connected at 15 with a tappet 16 slidably mounted on the valve rod link 8', and the tappet is confined between collars 17 which are adjustably secured to the valve rod link. Since the valve rod link 8' is oscillated slightly when reciprocated by the lever 9, the valve rod link is pivotally connected at 9' with the valve rod 8.

The main piston valve 7 controls the admission and exhaust of steam to the ends of the steam cylinder 2, while the pilot valve 6 controls the admission and exhaust of steam to the ends of the valve chest for actuating the main piston valve 7.

The main piston valve 7 is slidably contained in a bore 18 in the steam chest body 19, the latter being fixedly secured to the steam cylinder 2. Steam chest covers 20 are bolted to the ends of the body 19 to confine the main piston valve 7 in the bore 18.

Upon the steam chest body 19 is mounted a cover 21 which is provided with a chamber 22 for housing the pilot valve 23. In Figures 3 through 7, the steam chest body 19 is provided with a flat valve face or seat 24 upon which the pilot valve 6 is slidably mounted. This flat face is confined in the chamber 22, and this chamber is supplied with live steam through the medium of a port 26 which communicates with a steam inlet passage 27 in the steam chest body 19 (see Figure 8). The body 19 is provided with a threaded opening 28 for connection with a steam supply pipe (not shown).

Referring to Figure 2, the steam inlet passage 27 includes two branches 29, and these branches communicate with ports 30 and 31 in the valve chest body 19. Both ports 30 and 31 extend circumferentially of the bore 18 and have communication therewith. An exhaust steam passage 32 is provided in the steam chest body 19 and communicates with a port 33 extending circumferentially of the bore 18 and having communication therewith, the port 33 opening through the valve face 24. A threaded opening 34 is provided in the steam chest body 19 for connection with an exhaust steam pipe (not shown). The port 33 is located equal distances from the ports 30 and 31.

The steam chest body 19 also includes two ports 35 and 36 having communication with ports 37 and 38, respectively, in the steam cylinder 2, see Figure 1. The ports 35 and 36 are located on opposite sides of the centrally located exhaust steam port 33, and both ports extend circumferentially of the bore 18 and have communication therewith. Figures 3, 4, and 6 illustrate the steam chest body 19 as being provided with two live steam ports 39 and 40 and two exhaust steam ports 41 and 42. All the ports 39 through 42 open through the valve face 24 and communicate with the bore 18, the steam port 39 and the exhaust port 41 leading into one end of the bore 18, with the steam port 40 and the exhaust port 42 leading into the other end of the bore. Each steam port 39 and 40 includes a starting port 43 having communication with the bore 18, in addition to having full capacity communication when the main piston valve 7 has been advanced predetermined distances in the bore 18. Thus the passages 39 and 40 place the bore 18 in communication with the live steam chamber 22, the communication being controlled by the position of the pilot valve 23 on the valve face 24. Figure 4 illustrates the pilot valve 6 in one extreme position, at which time the port 40 has communication with the bore 18 and the chamber 22, while Figure 6 illustrates the pilot valve 6 in the other extreme position, at which time the port 39 has communication with the bore 18 and the live steam chamber 22.

Communication between the ports 41 and 42 and the exhaust port 33 is controlled by the position of the pilot valve 6. Figure 4 illustrates the exhaust port 41 as having communication with the port 33 through the medium of a passage 44 in the pilot valve 6. With the pilot valve 6 in the other extreme position of Figure 6, the exhaust steam port 42 communicates with the port 33 through the medium of the passage 44. It will be noted that both exhaust steam ports 41 and 42 open into the bore 18 slight distances from the steam chest covers 20 so that steam is trapped between the ends of the main piston valve 7 as it approaches either of its extreme positions for cushioning purposes.

The pilot valve 6 is provided with a flat face 45 which bears against the valve face 24. In the extreme position of the pilot valve 6, as shown in Figures 4 and 5, the port 39 is completely closed and the port 40 is completely uncovered. At the same time, the passage 44 communicates with the two ports 33 and 41, and the port 42 is completely uncovered. Thus when the pilot valve 6 is moved from the position of Figure 7 to that of Figure 5, both ports 40 and 42 are uncovered for communication with the live steam chamber 22. During such movement of the pilot valve 6, live steam is admitted to the bore 18 upon uncovering of the port 40, and additional live steam is admitted from the port 42 when the main piston valve 7 has moved from right to left a distance sufficient to uncover the end of the port 42 having communication with the bore 18. Similarly when the pilot valve 6 is moved from the position of Figure 5 to that of Figure 7, the port 40 is completely covered, the ports 33 and 41 are placed in communication one with the other, and the ports 39 and 41 are completely uncovered. Live steam is then admitted from the port 39 to the bore 18, and additional live steam is admitted to the bore upon movement of the piston valve 7 sufficiently far to uncover the exhaust port 41. The exhaust steam ports 41 and 42 therefore coact with the steam ports 39 and 40, respectively, to supply live steam to the bore 18, in addition to their exhaust functions with respect to the port 33.

The main piston valve 7 is provided with cylindrical heads 46 and 47, each having peripheral engagement with the face of the bore 18 for sealing purposes. The main piston valve 7 also includes two cylindrical heads or flanges 48 and 49, each having peripheral engagement with the face of the bore 18 for sealing purposes. Webs 50 connect the head 46 with the flange 48, and webs 51 connect the head 47 with the flange 49. All the parts of the main piston valve may be formed integrally, and the webs 50 and 51 are spaced one from the other circumferentially of the axis of the main piston valve to provide passages 52 and 53, respectively. A central passage 54 is provided in the body portion 55 of the main piston valve 7. The heads 46 and 47 and the flanges 48 and 49 are arranged in such axial spacing one from the other as to provide annular passages 56, 57, and 58 extending circumferentially of the main pilot valve 7.

With the pilot valve 6 in the position of Figures 4 and 5, live steam is first admitted to the bore 18 from the chamber 22 through the steam passage 40 and then from the exhaust port 42 for driving the main piston valve 7 to the position of Figure 4. During such movement of the main piston valve 7, steam is exhausted from the other end of the bore 18 through the port 41, the passage 44 and into the exhaust port 33, the latter communicating with the passage 32. As the main piston valve 7 is brought to the position of Figure 4, the flanges 48 and 49 maintain the ports 35 and 36 isolated one from the other, but live steam from the port 30 flows through the passage 54 and through the port 36, in addition to the live steam admitted to the port 36 from the port 31. This live steam is then admitted to the port 38 in the steam cylinder 2 for driving the piston 3 from right to left, as when viewing Figure 1. During movement of the piston 3 from right to left, steam is exhausted from the steam cylinder 2 through the port 37, the port 35, passage 57 and through the port 33 which communicates with the exhaust passage 32.

When the steam piston 3 reaches the end of the steam cylinder 2 in its movement from right to left, the valve rod 8 is moved to shift the pilot valve 6 to the position of Figure 6. Live steam is then admitted to the bore 18 from the live steam chamber 22 through the port 39 and subsequently from the port 41 for driving the main piston valve 7 from left to right, as when viewing Figure 6. Movement of the main piston valve 7 from left to right exhausts steam from the bore 18 through the port 42, passage 44 and the exhaust port 33. With the main piston valve 7 in the position of Figure 6, live steam is admitted to the port 37 in the steam cylinder 2 from the port 35, the passage 56, the port 30, and also from the passages 52, 54, 53, and the port 31. As the steam piston 3 moves from left to right in the steam cylinder 2 steam is exhausted from the steam cylinder through the ports 38 and 36, passage 57 and the port 33.

Figures 10 through 17 illustrate a different type of steam cylinder valve gear wherein the valve chest body 60 comprises a single casting in association with steam chest heads 61 for closing the ends of the bore 62. This body is provided with a second bore 63 within which is slidably mounted a pilot valve 64 of the piston type, a main piston valve 65 being slidably mounted in the bore 62.

The body 60 is provided with a live steam chamber 66 which terminates in a port 67 extending circumferentially of the bore 62 and communicating therewith. An exhaust steam chamber 68 is also provided in the body 60, this chamber terminating in ports 69 and 70 extending circumferentially of the bore 62 and having communication therewith. In addition, the body 60 includes ports 71 and 72 which also are shaped to extend circumferentially about the bore 62 for communication therewith. The ports 71 and 72 are similar to the ports 35 and 36 of Figures 4 and 6 in that they perform steam admitting and exhausting functions with respect to the steam cylinder (not shown).

The main piston valve 65 includes end heads 73 and 74 which have peripheral engagement with the wall of the bore 62. Axially spaced flanges 75 and 76 are also incorporated in the main piston valve 65 for peripheral engagement with the wall of the bore 62. Webs 77 fixedly connect the head 73 with the flange 75, which webs are spaced one from the other circumferentially of the main piston valve. In the same way, the head 74 is fixedly connected with the flange 76 by webs 78, which webs are also spaced one from the other circumferentially of the main piston valve. Thus the main piston valve 65 is similar to the main piston valve 7 and includes 3 circumferentially extending passages 79, 80, and 81.

Communication is established between the ports 69, 67, and 70, and the bore 63 through the medium of ports 82, 83, and 84, respectively. Live steam ports 85 and 86 lead from the bore 63 to the bore 62, each port having a starting passage 87 leading to one end of the bore 62. Two exhaust steam ports 88 and 89 also lead from the bore 63 to the bore 62, each port opening into the bore 62 a short distance from the one end thereof. Thus the main piston valve 73 operates to cut-off communication between the bores 62 and 63 before the piston reaches the end of either stroke to cushion the piston valve.

Figure 10:
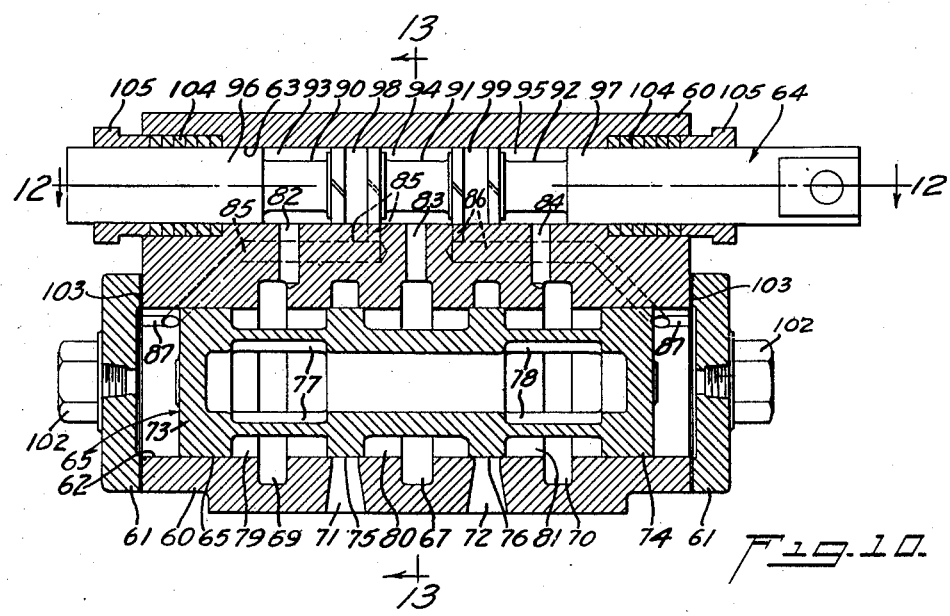
Figure 10 is a sectional view taken substantially along the line 10—10 of Figure 12.
Figure 11:
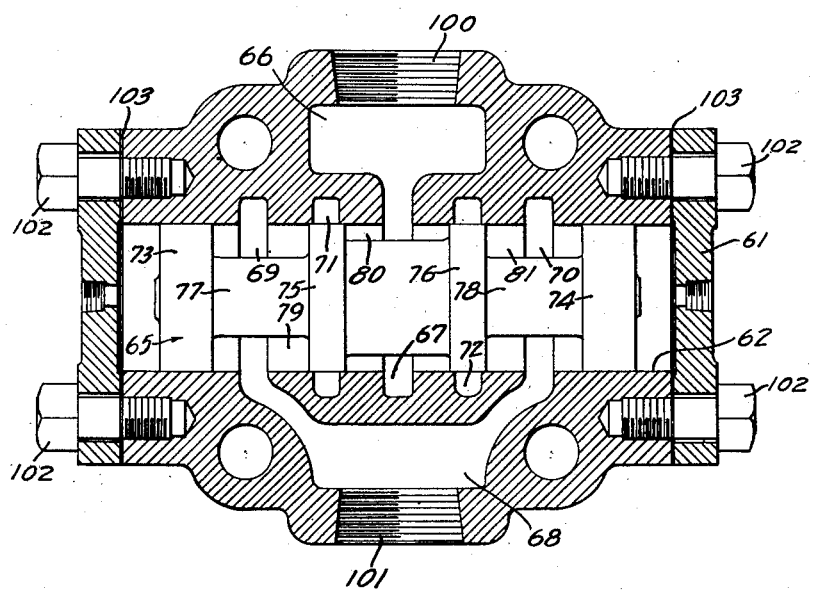
Figure 11 is a horizontal sectional view of the steam chest structure of Figure 10, but with certain parts shown in elevation.
Figure 12:
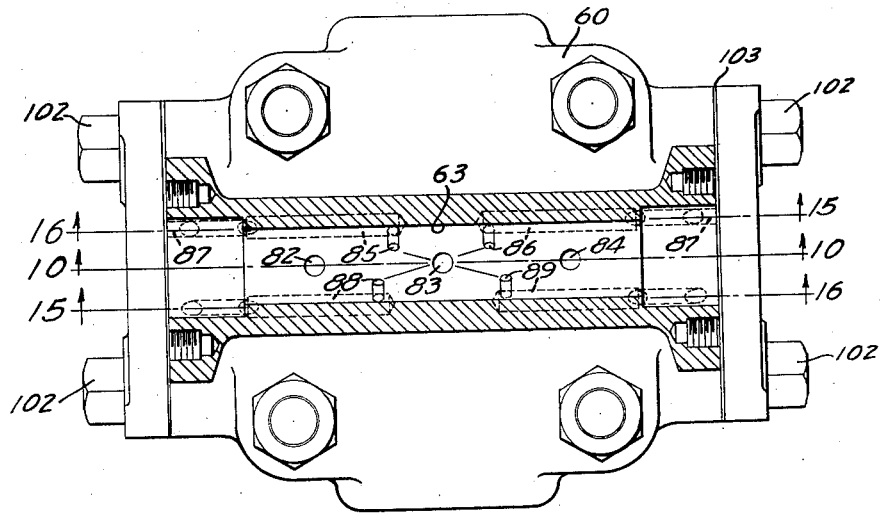
Figure 12 is a sectional view taken substantially along the line 12—12 of Figure 10, but with certain parts removed for the sake of clearness.
Figure 13:
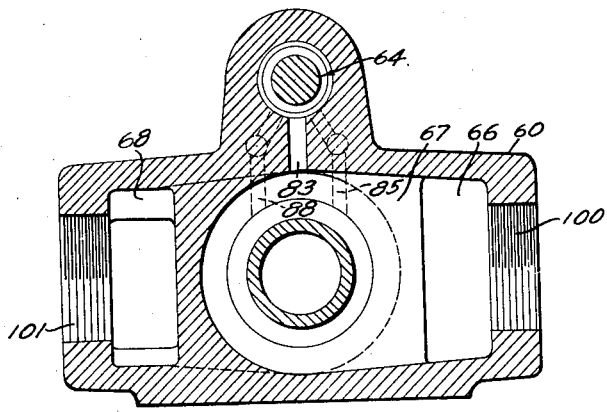
Figure 13 is a sectional view taken along the line 13—13 of Figure 10.

Figures 10 and 11 illustrate the pilot valve 64 in an intermediate position, which pilot valve may be operatively connected with a lever and link system identical with that shown in Figure 1. Figures 14 and 15 illustrate the pilot valve in one extreme position, while Figures 16 and 17 illustrate the pilot valve in its other extreme position. The pilot valve 64 is provided with three axially spaced circumferential grooves 90, 91, and 92 to provide three annular passages 93, 94, and 95, the passage 94 constituting a live steam chamber. Thus the pilot valve 64 comprises two cylindrical end portions 96 and 97 and two axially spaced piston bodies 98 and 99.

With the pilot valve 64 adjusted to the position of Figures 14 and 15, live steam is admitted from the port 83 to the annular passage 94 for delivery to the port 86 for driving the main piston valve 73 from right to left, as when viewing Figure 15. During such movement of the main piston valve 65, steam is exhausted from the bore 62 through the port 88 and the port 82 for delivery to the exhaust port 69. Figure 14 illustrates the ports 88 and 82 as being uncovered by the cylindrical portion 96 and the piston body 98, so that the annular passage 93 places these ports in communication one with the other.

With the main piston valve positioned according to Figure 15, live steam is admitted from the port 67 to the passage 80 and the port 71 for delivery to one end of the steam cylinder, the port 71 corresponding to the port 35 of Figure 1. Exhaust steam from the steam cylinder is admitted from the port 72 through the passage 81 to the port 70 for delivery to the exhaust chamber 68. Figure 11 illustrates the body 60 as being provided with threaded openings 100 and 101, having communication with the chambers 66 and 68, respectively. Live steam inlet and exhaust pipes (not shown) may be threaded into the bores 100 and 101, respectively.

Upon movement of the pilot valve 64 to the position of Figures 16 and 17, live steam is admitted from the port 83 to the passage 94 and the port 85 into the other end of the bore 62. Steam admitted to the bore 62 drives the main piston valve 65 from left to right, as shown in Figure 16. With the main piston valve 65 positioned as shown, live steam is admitted from the port 67 to the passage 80 and the port 72, the latter corresponding to the port 36 of Figure 1. Exhaust steam from the steam cylinder exhausts into the port 71, the passage 79 and the port 69. As the main piston valve 65 moves from left to right, steam exhausts from the bore 62 through the port 89, the passage 95 and the port 84 communicating with the port 70.

The steam chest heads 61 are attached to the body 60 by bolts 102, gaskets 103 being interposed between the heads and the adjacent ends of the body 60. Packing 104 is provided for the pilot valve 64, which packing is compressed by glands 105.

In a construction such as that shown in Figures 10 through 17, live steam is admitted to the passage 94 only in any position of the pilot valve 64. Exhaust steam only is admitted to either of the passages 93 and 95. Thus the port arrangement is such that the packing 104 is subjected to exhaust steam pressure only so that less gland pressure is required on the packing.

Figure 9:
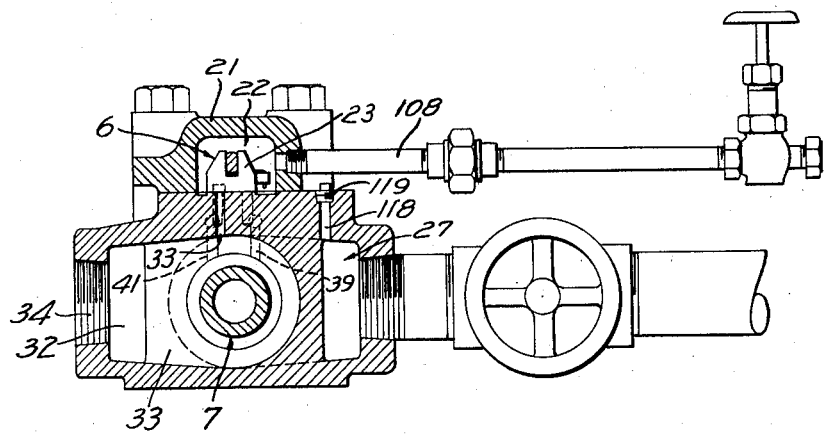
Figure 9 is a view similar to Figure 8 but illustrating a modified structure.

Figure 9 illustrates a steam valve gear identical with that of Figures 1 through 8 with the exception that the port 26 of Figure 8 is either omitted or plugged. The construction of Figure 9 is useful in vacuum pump installations and other services where the pump operates at exceptionally low speed and on low pressure. Such pumps occasionally stop for the reason that there is not sufficient steam pressure in the chamber 22 to throw the main piston valve 7. Accordingly, Figure 9 illustrates a live steam supply pipe 108 as having communication with the chamber 22 to supply steam at higher pressure for throwing the main piston valve.

Referring to Figures 4, 6, and 8, the pilot valve 6 is provided with spaced fingers 110 which engage flat faces 111 on the valve rod 8. While the pilot valve 6 may shift laterally of the valve rod 8, perpendicularly to the valve face 24, the pilot valve is restrained from relative shifting longitudinally of the valve rod 8. A spring 112 has one end anchored to a lug 113 fixed to the pilot valve 6 and is shaped to engage underneath the valve rod 8 to cause the pilot valve to bear on the valve face 24. This provides a construction wherein the pilot valve 6 is brought into proper sealing engagement with the valve face 24 when the cover 21 is assembled with the steam chest body 19. In addition, the spring compensates for wear on the pilot valve, the valve face or both.

The valve rod 8 passes through a packing 114 in the cover 21, which packing is placed under compression by glands 115.

Bolts 116 secure the valve chest heads 20 to the ends of the body 19, gaskets 117 being interposed between the heads and the body.

In the structure of Figures 1 through 8, the ports 39, 40, 41, and 42 are of the bored type. Figure 3 illustrates those portions of the ports extending through the ends of the body 19 as being threaded at 117 for reception of plugs. In lieu of boring, the ports may be cored. While the cover 21 co-acts with the body 19 to provide a live steam chamber 22, all the ports and passages are formed in the body 19. The port 26 of Figure 8 may also be bored or cored. In arranging the ports in the manner shown, all the ports are contained in a single body, which eliminates the necessity of forming a multiplicity of co-acting ports in a second member, as is required in steam chest constructions wherein a cover or equivalent member is provided with ports in continuation of those in the principal body structure of the steam chest.

The structure of Figures 10 through 14 is also similar to the structure of Figures 1 through 8 with respect to port construction and arrangement. While Figures 10 through 14 show ports of the cored type, all the ports are contained in a single body, and their arrangement is such that the ports may be bored and subsequently plugged where necessary. It is obvious that where necessary the ports 82, 83, 84, 85, 86, 88 and 89 may be bored by drilling transversely through the bore 63 which contains the pilot valve 64, and then plugging the unnecessary lengths of the bores.

While Figures 1 through 8 employ a flat valve face 24 and a pilot valve having a flat face co-acting with the valve face 24, the structure of Figures 10 through 14 is functionally similar in this respect in that the wall face of the bore 63 defines a chamber for the pilot valve 64 and also constitutes a valve face co-active with the cylindrical face of the pilot valve 64. In the structure of Figures 1 through 8, the pilot valve 6 is housed between the cover 21 and the steam chest body 19, while in the structure of Figures 10 through 14 the upper part of the body defining the bore 63 also constitutes a cover formed integrally with the body 60.

In Figure 8, the steam chest body 19 is provided with a passage 118 through which lubricant may be admitted inside the steam chest body on the live steam inlet side. This passage is closed by a plug 119. The steam cylinder 2 of Figure 1 is provided with a manually adjustable cushion valve 120 at each end, the steam cylinder starting ports 121 passing through the valve.

In all the forms, the main piston valves are generally hollow and provided with passages so that steam is caused to flow alternately through the piston valves as they move from one end to the other of their respective bores. The passages in and about the piston valves are of such proportions as to provide unrestricted flow of steam to the various ports, and the flow of steam through the piston valves results in an even expansion of the metal due to the heat balancing arrangement of the passages in the piston valves.

It will be understood that the invention is not to be limited to the specific construction or arrangement of parts shown, but that they may be widely modified within the invention defined by the claims.

While the term "port" has been hereinbefore used to describe the annular chambers 30, 35, 33, 36, and 31, it will be understood that in the following claims it is used in a broader sense so that it also includes other types of openings for the passage of steam into and out of the bore 18.

What is claimed is:

1. In a steam cylinder valve gear, an elongated housing having a cylindrical bore and steam ports adjacent each end of the bore, pilot valve means for controlling the flow of steam to and from said steam ports, a steam cylinder having a piston reciprocably mounted therein, said housing having five axially spaced ports opening into the cylindrical bore, steam passage means for connecting the middle port to exhaust, steam passage means connecting one of the two intermediate ports to one end of the steam cylinder, steam passage means connecting the other intermediate port to the other end of the steam cylinder, steam passage means for connecting the two end ports to a source of steam, a piston valve having end flanges and two axially spaced intermediate flanges reciprocably mounted in the cylindrical bore, said piston valve having a hollow interior between the two end flanges, said piston valve having openings between the end flanges and the intermediate flanges to connect the bore to the hollow interior, said piston valve flanges and said ports being constructed and arranged so that when the piston valve is in its limiting position at the proximal end of the bore the end port of that end of the bore will lie between the end flange and the adjacent intermediate flange of the valve, the proximal intermediate port and the middle port will lie between the intermediate flanges, and the distal intermediate port and the distal end port will lie between the distal intermediate flange and the distal end flange whereby the two end ports will communicate with the distal intermediate port to deliver steam to one end of the piston and the proximal intermediate port will communicate with the middle port to exhaust steam from the other side of the piston.

2. In a steam cylinder valve gear, an elongated housing having a cylindrical bore, steam passages connecting the first end of the bore to a first exterior section of the housing, steam passages connecting the second end of the bore to a second exterior section of the housing, said housing having five axially spaced ports opening into the cylindrical bore, a steam passage connecting the middle port to a third exterior section of the housing between the first and second exterior sections, steam passage means for connecting the middle port to exhaust, steam passage means for connecting the first end port and the second end port to a source of steam, a steam cylinder having a piston reciprocably mounted therein, steam passage means connecting the first intermediate port to one end of the steam cylinder, steam passage means connecting the second intermediate port to the other end of the steam chamber, a piston valve having first and second end flanges and first and second axially spaced intermediate flanges, said valve being reciprocably mounted in said bore so that the first flanges are in the first half of the bore and the second flanges are in the second half of the bore, said piston valve being hollow between the two end flanges and having openings between the end flanges and the intermediate flanges to connect the bore to the hollow interior, said flanges and said ports being arranged and constructed so that when the piston valve is in its limiting position at the first end of the bore the first end port lies between the first end flange and the first intermediate flange of the valve, the first intermediate port and the middle port lie between the first and second intermediate flanges, and the second intermediate port and second end port lie between the second intermediate flange and the second end flange, a cover attached in fluid tight relationship to the housing over the first, second, and third sections to which the steam passages are connected, means for admitting steam to the inside of the cover, a pilot valve reciprocably mounted in the cover, said pilot valve having means coacting with the steam passage connections so that when the pilot valve is in a first limiting position the first end of the bore is connected to the middle port and the second end of the bore is connected to the steam admitting means and when the pilot valve is in a second limiting position the first end of the bore is connected to the steam admitting means and the second end of the bore is connected to the middle port, and means connecting the piston to the pilot valve so that reciprocable movements of the former actuate reciprocable movements of the latter.

ERIC J. LIFNER.

REFERENCES CITED

The following references are of record in the file of this patent:

UNITED STATES PATENTS

| Number | Name | Date |
|---|---|---|
| 262,293 | Henshall | Aug. 8, 1882 |
| 518,846 | Kwis | Apr. 24, 1894 |
| 539,742 | Jenkins | May 21, 1895 |
| 737,610 | Hall | Sept. 1, 1903 |
| 896,571 | Ocain | Aug. 18, 1908 |
| 1,437,704 | Barrance | Dec. 5, 1922 |
| 1,661,957 | Powell | Mar. 6, 1928 |
| 1,850,619 | England | Mar 22, 1932 |
| 2,095,287 | Rockwood | Oct. 12, 1937 |

FOREIGN PATENTS

| Number | Country | Date |
|---|---|---|
| 22,897 | Great Britain | Oct. 17, 1907 |
| 5,729 | Great Britain | Mar. 8, 1910 |
| 416,697 | Great Britain | Sept. 19, 1934 |
| 544,391 | France | June 21, 1922 |
| 79,893 | Germany | Apr. 1, 1895 |